(12) United States Patent
Schwarze

(10) Patent No.: US 9,828,188 B2
(45) Date of Patent: Nov. 28, 2017

(54) BELT STRIPPER HAVING MODULE INCLINATION

(71) Applicant: Hans-Otto Schwarze, Recklinghausen (DE)

(72) Inventor: Hans-Otto Schwarze, Recklinghausen (DE)

(73) Assignee: Hans-Otto Schwarze, Recklinghausen (DE)

( * ) Notice: Subject to any disclaimer, the term of this patent is extended or adjusted under 35 U.S.C. 154(b) by 0 days.

(21) Appl. No.: 15/308,413

(22) PCT Filed: Apr. 23, 2015

(86) PCT No.: PCT/EP2015/000837
§ 371 (c)(1),
(2) Date: Nov. 2, 2016

(87) PCT Pub. No.: WO2015/165577
PCT Pub. Date: Nov. 5, 2015

(65) Prior Publication Data
US 2017/0081131 A1 Mar. 23, 2017

(30) Foreign Application Priority Data

May 2, 2014 (DE) .................. 10 2014 006 281

(51) Int. Cl.
*B65G 45/16* (2006.01)
*B65G 45/12* (2006.01)

(52) U.S. Cl.
CPC ............. *B65G 45/12* (2013.01); *B65G 45/16* (2013.01)

(58) Field of Classification Search
CPC ................................ B65G 45/12; B65G 45/16
USPC ................................ 198/494, 497, 498, 499
See application file for complete search history.

(56) References Cited

U.S. PATENT DOCUMENTS

| 3,342,312 A | 9/1967 | Reiter |
| 3,504,786 A | 4/1970 | Matson |
| 3,952,863 A | 4/1976 | Schattauer |

(Continued)

FOREIGN PATENT DOCUMENTS

| DE | 3620960 A1 | 1/1988 |
| DE | 9308826 U1 | 10/1994 |

(Continued)

*Primary Examiner* — Douglas Hess
(74) *Attorney, Agent, or Firm* — Leydig, Voit & Mayer, Ltd.

(57) ABSTRACT

A belt-stripper module for a conveyor belt includes a stripping body. The stripping body includes a cutter carrier, a stripping blade attached thereto and a stripping edge unit attached to the stripping blade. The cutter carrier is rotatable about a stripping-body axis of rotation. The stripping edge unit is positionable so as to form an obtuse angle β relative to the conveyor belt in a running direction of the conveyor belt and to rest against the conveyor belt at an acute angle α, as measured at a right angle to the running direction and as seen in direction of the belt surface. The stripping-body axis of rotation intersects the stripping edge unit of the stripping blade at a point of intersection. A stripping-body pivot axis connecting the base and stripping body, as seen in the running direction, is located in front of the point of intersection.

10 Claims, 6 Drawing Sheets

(56) References Cited

U.S. PATENT DOCUMENTS

| | | | | |
|---|---|---|---|---|
| 3,994,384 A * | 11/1976 | Reiter | ................... | B65G 45/16 15/256.6 |
| 4,633,999 A * | 1/1987 | Perneczky | ............. | B65G 45/16 15/256.5 |
| 4,768,644 A * | 9/1988 | Cromm | ................. | B65G 45/12 15/256.5 |
| 4,838,409 A * | 6/1989 | Rappen | .................. | B65G 45/12 198/497 |
| 5,082,106 A | 1/1992 | Schwarze | | |
| 5,518,107 A * | 5/1996 | Schwarze | ............. | B65G 45/16 198/499 |
| 5,950,803 A * | 9/1999 | Schwarze | ............. | B65G 45/16 198/497 |
| 6,056,112 A * | 5/2000 | Wiggins | ................ | B65G 45/16 198/497 |
| 6,321,901 B1 * | 11/2001 | Strebel | .................... | B65G 45/12 15/256.5 |
| 6,374,991 B1 * | 4/2002 | Swinderman | ......... | B65G 45/12 198/499 |
| 6,681,919 B1 * | 1/2004 | Brink | .................... | B65G 45/16 198/499 |
| 6,843,363 B2 * | 1/2005 | Schwarze | .............. | B65G 45/16 198/497 |
| 8,485,344 B1 * | 7/2013 | Liland | ................... | B65G 45/16 198/499 |
| 9,517,493 B2 * | 12/2016 | Schwarze | .............. | B08B 1/005 |
| 2007/0137984 A1 * | 6/2007 | Veenhof | | |
| 2010/0206695 A1 * | 8/2010 | Schwarze | | |
| 2011/0209969 A1 * | 9/2011 | Zieger et al. | | |
| 2015/0360880 A1 * | 12/2015 | Krosschell et al. | | |
| 2016/0001329 A1 | 1/2016 | Schwarze | | |
| 2016/0001982 A1 * | 1/2016 | Krosscheell et al. | | |

FOREIGN PATENT DOCUMENTS

| | | |
|---|---|---|
| DE | 102013006821 A1 | 7/2014 |
| EP | 0254977 B1 | 2/1988 |
| WO | WO 9408877 A1 | 4/1994 |

* cited by examiner

BELT STRIPPER HAVING MODULE INCLINATION

CROSS-REFERENCE TO PRIOR APPLICATIONS

This application is a U.S. National Stage Application under 35 U.S.C. §371 of International Application No. PCT/EP2015/000837 filed on Apr. 23, 2015, and claims benefit to German Patent Application Nos. DE 10 2014 006 281.3 filed on May 2, 2014. The International Application was published in German on Nov. 5, 2015 as WO 2015/165577 A1 under PCT Article 21(2).

FIELD

The invention relates to a belt-stripper system made up of modules for the return region of conveyor belts, wherein the belt-stripper system comprising an adjustable, fixed or resiliently mounted carrier in the direction transverse to the running direction of the belt and also a plurality of stripping modules attached one beside the other on the carrier. The stripping modules each carry a stripping blade, which abuts the belt with peeling action, and are pressed resiliently onto the belt. Corresponding belt-stripper systems have long been tried and tested in the prior art, EP 254 977 B1 being mentioned here by way of example.

BACKGROUND

The known belt-stripper systems are used for a wide variety of conveyable materials and under extremely different conveying conditions. They always have to operate reliably even in the event of bulk-material properties that change quickly, for example outdoors when rain sets in, and at considerable distances from repair workshops, for example in the extraction of raw materials, wherein long service lives are required. Since it is usually the case that production stoppages result in high follow-up costs, the stoppage times should be kept as brief as possible.

These requirements are met by a modular construction. Conventional modules, as are described by way of example in EP 254 977 B1 and DE OS 36 20 960, have:
- a base, which is attached to one of the carriers,
- and a stripping body comprising
  - a cutter carrier, to which a stripping blade is attached,
  - a bushing, in which the cutter carrier is rotatably mounted, and
  - a stripping edge unit, which is attached to the stripping blade,
- a joint having a torsion spring, the joint connecting the base and stripping body via a rubber torsion spring.

It is usually the case that a plurality of belt-stripper modules are arranged one beside the other on a system carrier. Long service lives are also achieved by the stripping blades having wear-resistant carbide stripping edge units.

Such a belt-stripper module which is intended for a stripping apparatus for the return region of conveyor belts and is installed as one of a plurality of belt-stripper modules on a height-adjustable system carrier is also described in DE 10 2013 006 821 A1, and has the following features:
- a base, which is fastened to the system carrier,
- a cutter carrier, to which a stripping blade having a stripping edge unit is attached, the stripping blade forming an obtuse angle β in relation to the belt in the running direction,
- a stripping body having a joint housing which has two joints and in which
  - a first joint, of which the axis of rotation extends transversely to the running direction of the belt and which has a torsion spring, connects the base and stripping body, the torsion spring pressing the stripping blade onto the belt in the process, and the first joint is provided with a spring-angle-measuring means and with a fixed stop for the deflection,
  - a second joint, of which the axis of rotation extends longitudinally in relation to the running direction of the belt and which has a bushing, in which the cutter carrier is rotatably mounted, orients the cutter carrier on the running belt such that the stripping edge unit always rests against the belt in a planar manner, and
- a means for adjusting the height of the belt-stripper module on the base.

In this case, the belt-stripper modules are arranged one beside the other on a system carrier such that the stripping blades, as seen in a plan view, are oriented precisely at right angles to the running direction of the belt. As seen from the side, the stripping blade, in contrast, forms an obtuse angle in relation to the belt, wherein said angle changes slightly in accordance with wear over the course of the service life.

A long-known problem with belt conveyors is that a large number of bulk materials, e.g. oil sands, tend to stick together and thus clog up the belt-stripper modules. The belt-stripper modules therefore have to be configured such that the largest possible through-passage surface area remains between the individual modules and the belt-stripper modules provide few opportunities for the bulk material to build up.

A further difficulty arises in the case of belt strippers where there are offset belt strippers pressing against an elastic belt in two or more rows arranged one behind the other. This gives the belt undulating characteristics, which adversely affect the stripping action. Added to this is the fact that, in the case of a plurality of belt-stripper modules above a system carrier, the stripping action of the individual belt-stripper modules overlaps. This gives rise to further problems relating to wear being non-uniform.

The largest possible through-passage surface areas are achieved for pulling-action belt-stripper modules when these are positioned slightly obliquely. Such belt-stripper modules are already known. Thus, U.S. Pat. No. 3,504,786 describes such an arrangement, FIG. 2 of this document showing an apparatus in which merely the stripping blades are positioned obliquely, and FIG. 3 showing an apparatus in which both the stripping blades and the cutter carriers are oriented obliquely in relation to the running direction of the belt. It is also shown here (reference sign 40) that the material is removed obliquely at the side, which gives rise to a reduction in the tendency of the material to build up. The obliquely positioned cutter carriers, however, are not mounted in a rotatable manner and cannot automatically orient themselves on the belt.

Scientific experiments have also proven the advantages of obliquely positioned strippers. These are described by "Zhang, Dynamisches Verhalten von Stahllamellen-Abstreifern an Gurtforderern, Universitat Hannover, [Zhang, Dynamic Behaviour of Steel-Blade Strippers on Belt Conveyors, University of Hannover], Dissertation 1982". This dissertation determined, inter alia, that the cleaning capacity markedly increases if the blades are positioned obliquely.

Although the advantages of obliquely positioned belt strippers—as outlined above—are perfectly well known, it has not been possible for obliquely positioned strippers to become widespread in practice.

SUMMARY

In an embodiment, the present invention provides a belt-stripper module for a stripping apparatus for a return region of a conveyor belt. A base is fastenable in a system carrier. A stripping body includes a cutter carrier, a stripping blade attached to the cutter carrier, a bushing and a stripping edge unit attached to the stripping blade. The cutter carrier is mounted in the bushing such that the cutter carrier is rotatable about a stripping-body axis of rotation. The stripping edge unit is positionable so as to form an obtuse angle β relative to the conveyor belt in a running direction of the conveyor belt and to rest against the conveyor belt at an acute angle α, as measured at a right angle to the running direction and as seen in direction of the belt surface. The stripping-body axis of rotation is oriented such that the stripping-body axis of rotation intersects the stripping edge unit of the stripping blade at a point of intersection. A stripping-body pivot axis has a torsion spring and connects the base and stripping body in such a manner that the stripping-body pivot axis is configured to press the stripping body against the conveyor belt. The stripping-body pivot axis, as seen in the running direction, is located in front of the point of intersection.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
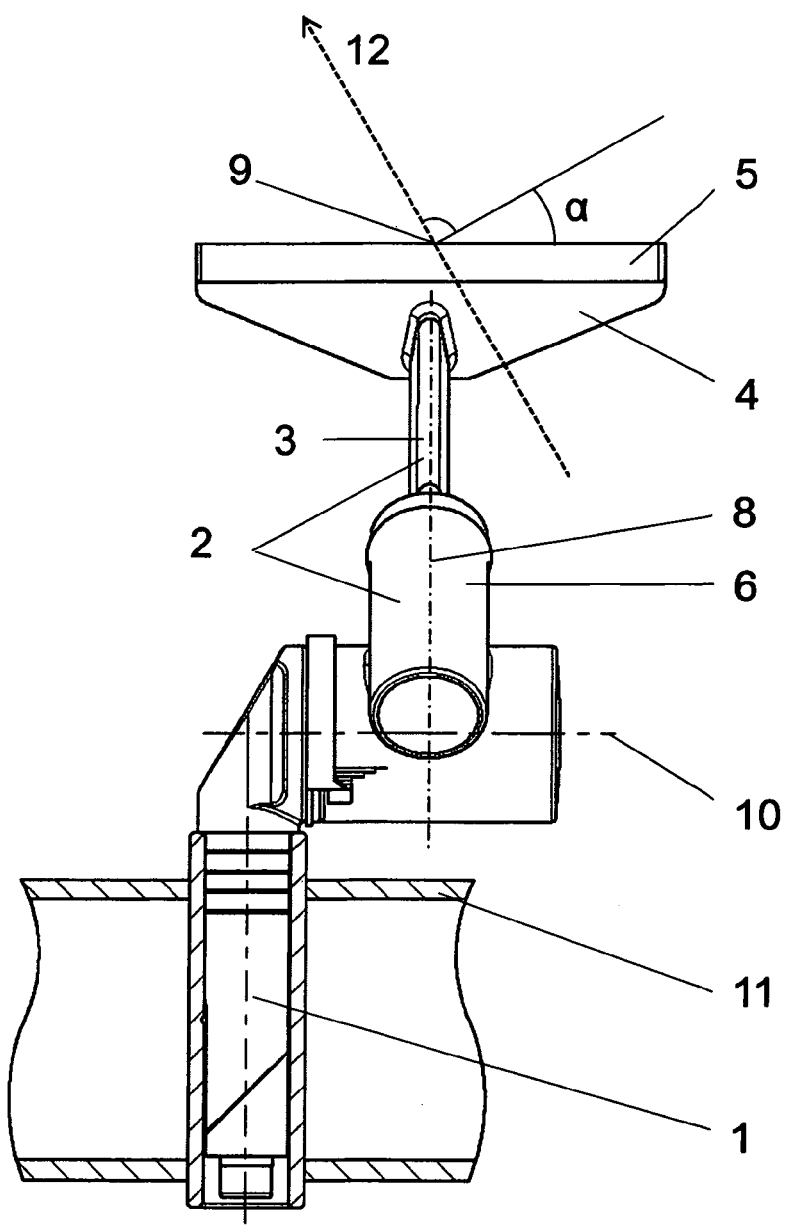
FIG. 1a is a front view of the belt-stripper module in which the belt-stripper module is positioned obliquely.

In an embodiment, the invention provides a straightforward and cost-effective apparatus which solves the problems described above. A return run of the belt, as occurs frequently for various reasons, is also possible without the stripper or the belt being damaged.

The invention, in an embodiment, provides a belt-stripper module for a stripping apparatus for the return region of conveyor belts, comprising:

a base, which is fastened in a system carrier,
a stripping body comprising
   a cutter carrier, to which a stripping blade is attached,
   a bushing, in which the cutter carrier is mounted such that it can be rotated about a stripping-body axis of rotation, and
   a stripping edge unit, which is attached to the stripping blade,
   wherein the stripping blade forms an obtuse angle β relative to the belt, in the belt running direction, and
a stripping-body pivot axis having a torsion spring, which axis connects the base and stripping body and presses the stripping body against the belt in the process,
wherein:
the stripping edge unit rests against the belt at an acute angle α, as measured at a right angle to the belt running direction and as seen in the direction of the belt surface,
the stripping-body axis of rotation is oriented such that it intersects the stripping edge unit of the stripping blade, and
the stripping-body pivot axis, as seen in the belt running direction, is located in front of the point of intersection of the stripping edge unit of the stripping blade.

In relation to the abovementioned document DE 10 2013 006 821 A1, the belt-stripper modules are thus rotated about an axis which leads vertically through the belt, to be precise they are rotated by the angle α. This angle should be differentiated from the obtuse angle β, which the stripping blade forms in the pressing-on direction relative to the belt in the running direction thereof, wherein the axis of rotation extends through the belt itself. Whereas the axis of rotation of the obtuse angle β in the case of DE 10 2013 006 821 A1 forms a right angle to the belt running direction, in the present case it has been rotated by the same angle α, but still extends in the belt plane.

Furthermore, it is also the case, in an embodiment, that the longitudinal axis of rotation, about which the stripping body can be rotated, is important. This longitudinal axis of rotation is neither oriented perpendicularly to the belt, nor is it located in the belt plane; rather, it forms an acute solid angle in relation to the belt.

The precise angular position of the longitudinal axis of rotation is unimportant for the functioning of an embodiment of the invention; all that is important is for the stripping blade to abut the belt at the point of intersection of the longitudinal axis of rotation through the belt.

Embodiments of the invention provide for the angle α to be selected between 5 and 45 degrees, preferably between 10 and 30 degrees and particularly preferably to be 15 degrees.

In an embodiment, it is important for the stripping-body axis of rotation, which is located in the center of the stripping edge unit, to intersect the belt surface at the point at which the stripping blade comes into contact with the belt surface, and for the stripping body to be able to orient itself automatically. It is only in this position of the stripping-body axis of rotation that even wear of the stripping edge unit of the blade is achieved.

This is due to the fact that the oblique positioning of the stripper blade typically generates torques about the stripping-body axis of rotation which arise as a result of unsymmetrically acting frictional forces, of forces resulting from the stripped-off material and from restoring forces of the stripper module, and these torques give rise to different contact pressures of the stripping edge unit against the belt over the length of the stripping edge unit. As soon as the stripping-body axis of rotation, however, is oriented such that it intersects the stripping edge unit of the stripping blade precisely at the point at which the stripping edge unit rests against the belt, no more torques occur.

There is no need, however, for this point of intersection to be constantly set precisely during operation; minor deviations from the point of intersection are immaterial and admissible, since such minor deviations result in only small torques about the stripping-body axis of rotation.

In a further embodiment of the invention, provision is therefore made for the location of the point of intersection between the stripping-body axis of rotation and the stripping edge unit of the stripping blade to be selected to be halfway up the wear height of the stripping edge unit. In this case, when the modules are new, in the first instance slightly non-uniform wear takes place, this wearing the stripping edge unit on one side to a more pronounced extent than on the other side. As soon as half the wear height has been worn away, the stripping-body axis of rotation is located precisely at the point at which the stripping edge unit rests against the belt and the wear is precisely uniform. Upon further travel, and as wear progresses, the non-uniformity of the wear reverses, precisely, provided the operating conditions are the same, and the other side wears to a more pronounced extent. At the end of the module service life, the slightly non-uniform wearing operations have balanced each other out precisely and the stripping edge unit has been subjected to uniform wear.

The advantage of an embodiment of the invention is that each stripping blade orients itself automatically such that the wear is uniform, although the belt-stripper modules are positioned obliquely. The advantages of obliquely positioned belt strippers—a greater amount of clearance for the removal surface and greater cleaning capacity—therefore need no longer be achieved at the expense of wear being non-uniform.

It is likewise important, in an embodiment, for the stripping action to take place with pulling action at all times. This means that the stripping-body pivot axis, or the projection of the latter vertically onto the belt, as seen in the belt running direction, is located in front of the point of intersection between the stripping edge unit and the belt.

The oblique positioning is effected by one or more of the following measures:
- the angle α is set between the stripping-body axis of rotation and the stripping-body pivot axis, for example by appropriate production of the housing which accommodates the two axes of rotation.
- The angle α is achieved by the stripping blade being fastened in an angled manner to the cutter carrier, that is to say that there is a set angle between the stripping edge unit and stripping-body axis of rotation. For example, it is possible for the stripping blade to be angled laterally on the cutter carrier.
- The angle α is set by virtue of the base of the belt-stripper module as a whole being installed in a rotated state on the system carrier.

If use should be made of a combination of these oblique-positioning measures, the oblique-positioning angle α has to be determined by addition of the individual solid angles, the oblique-positioning angle always being measured at the position of the stripping edge unit in relation to the right angle to the belt running direction.

In a further embodiment of the invention, a plurality of, in particular 1 to 20, the belt-stripper modules are arranged one beside the other on a system carrier, wherein the number of belt-stripper modules used depends on the width of the belt. The belt-stripper modules all have the same angle α. The stripping edge units of these belt-stripper modules overlap, in order to achieve gap-free, uninterrupted cleaning of the entire belt surface.

FIG. 1a shows a front view of the belt-stripper module having a base 1, and having a stripping body 2, which contains a cutter carrier 3, to which a stripping blade 4 is attached, the stripping edge unit 5 being attached to the tip of said stripping blade. The stripping body 2 also contains the bushing 6, in which the cutter carrier 3 is mounted in a freely rotatable manner. The bushing 6 is rigidly connected to the stripping-body pivot axis 10 and itself forms the stripping-body axis of rotation 8. This stripping-body axis of rotation 8 intersects the stripping edge unit 5 at the point of intersection 9.

The system carrier 11 has connected to it a stripping-body pivot axis 10 having a torsion spring, which pivot axis connects the base 1 and stripping body 2 in a pivotable manner and presses the stripping body 2 against the belt in the process. The belt running direction 12 extends obliquely in the Fig., since the illustration has been rotated by the oblique-positioning angle α. In the variant shown in FIG. 1a, the stripping-body pivot axis 10 and the stripping-body axis of rotation 8 remain at right angles to one another and the oblique positioning of the stripping edge unit 5 in relation to the belt running direction 12 is achieved by corresponding installation of the base 1 in the system carrier 11.

Figure 1B:
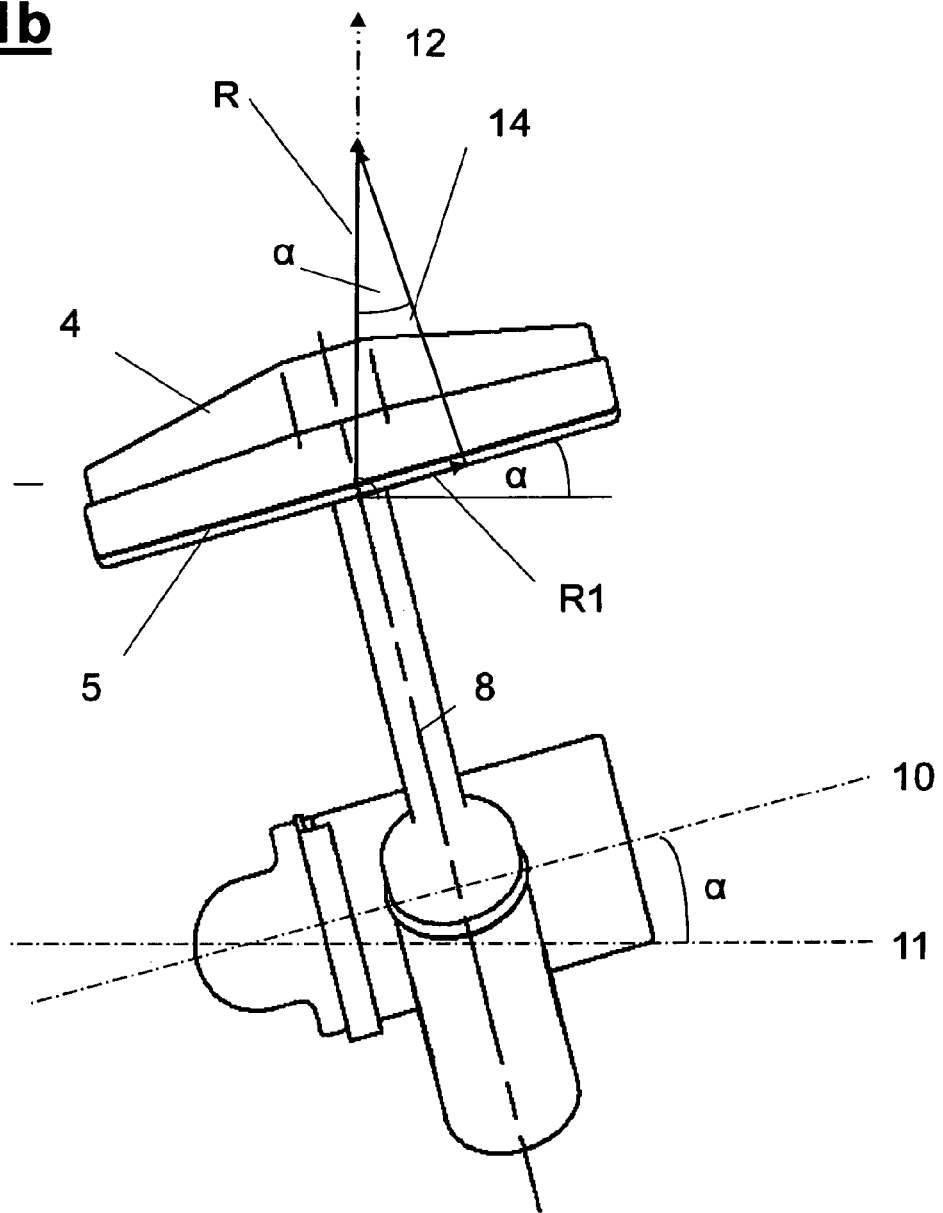
FIG. 1b is a plan view of the belt-stripper module as in FIG. 1a, FIG. 2 is a side view of the belt-stripper module as in FIG. 1a, FIG. 3 is a plan view of the belt-stripper module in which the stripping blade is angled.

FIG. 1b is a plan view of the belt-stripper module as in FIG. 1a. In order to portray the action according to the invention, the triangle of forces 14 which arises on account of the frictional forces is depicted by way of example. The frictional force R here is a combination of all the frictional forces which occur from the interaction of the belt-stripper module and belt and also the material to be stripped, it being possible for said frictional forces to be variable over time. It is only when the stripping-body axis of rotation 8 is positioned according to the invention that the frictional-force component R1 shown, which does not occur in the case of a stripping blade 4 that is transverse to the belt running direction 12 (α=0°), has no influence on the compressive forces of the stripping blade 4, since said force acts centrally on the axis of rotation, and thus does not have a lever arm and so does not generate any torque either. Any other position of the stripping-body axis of rotation 8 intersecting the belt at a distance above or beneath the points of contact between the belt and stripper edge unit inevitably generates a corresponding torque. The corresponding pair of forces from this torque inevitably always gives rise to non-uniform pressure distribution over the blade length. It is then also the case that the blade is subjected to correspondingly non-uniform wear.

Figure 2:
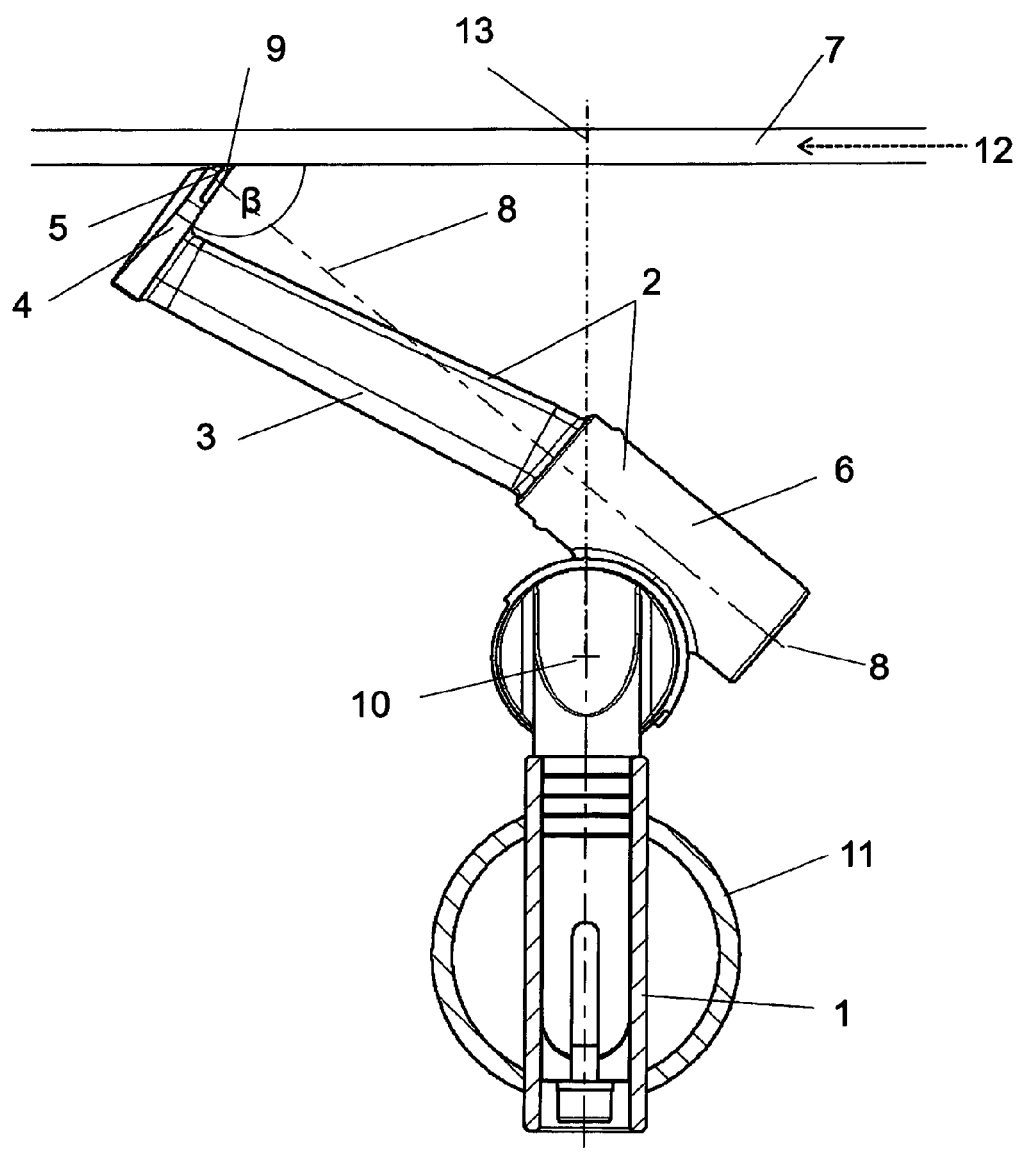

FIG. 2 is a side view of the belt-stripper module as in FIG. 1. The stripping-body axis of rotation 8 intersects the stripping edge unit 5 at the point of intersection 9, halfway up the wear height of the stripping edge unit 5. As the wear of the stripping edge unit 5 progresses, said point of intersection 9 moves in the direction of the belt 7 and through the same. The projection of the stripping-body pivot axis 10 comes into contact with the belt in the projection line 13, which is located in front of the point of intersection 9 in the belt running direction 12. FIG. 2 also shows the obtuse angle β between the belt 7 and the stripping blade 4, the axis of rotation of the obtuse angle β corresponding to the position of the longitudinal axis of the stripping edge unit 5.

Figure 3:
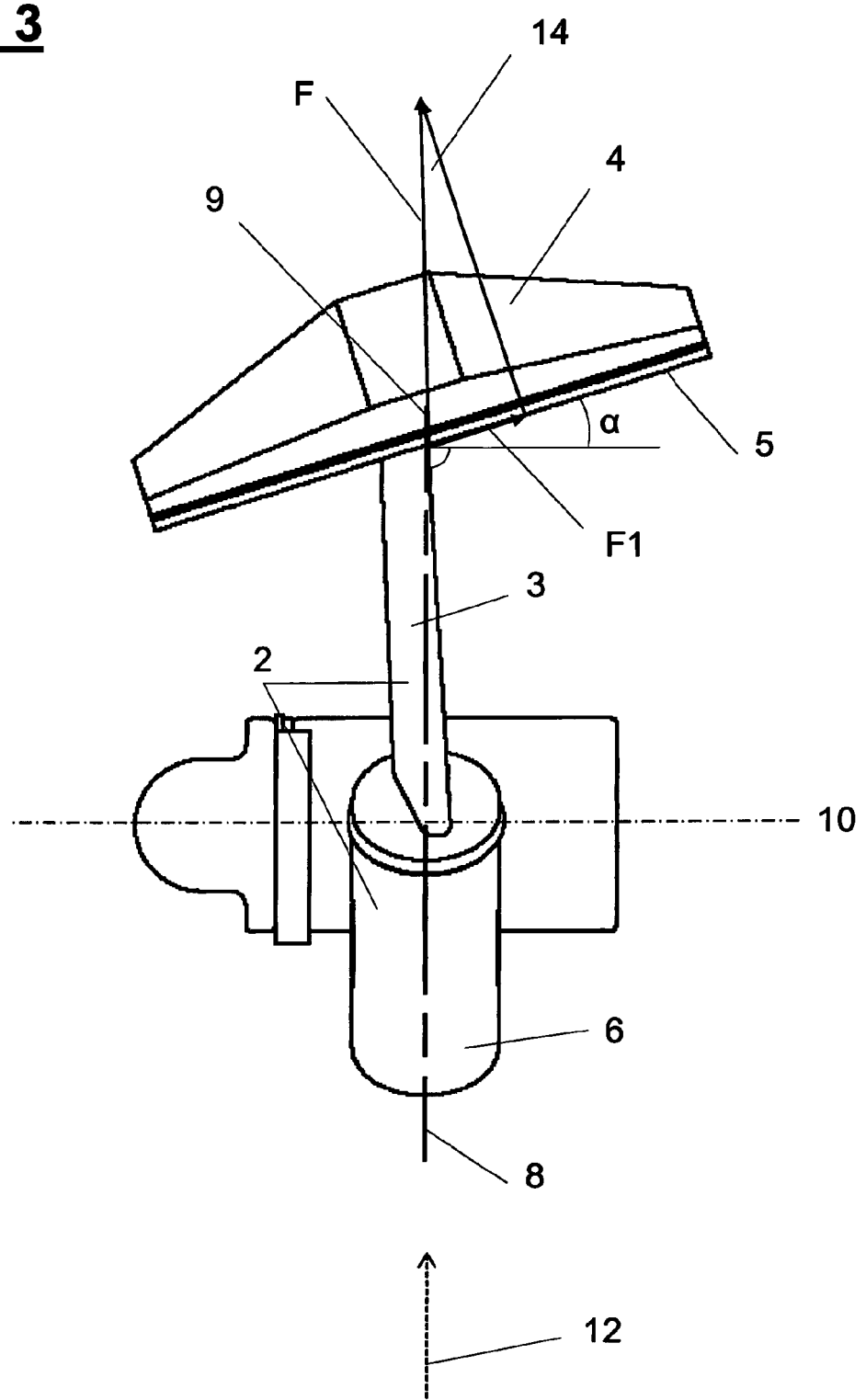

FIG. 3 is a plan view of a belt-stripper module having the oblique-positioning angle α, at which the stripping edge unit 5 is fastened obliquely to the cutter carrier 3. The rotatability of the stripping-body axis of rotation 8 correspondingly allows the rotation of the stripping edge unit 5 on the belt, for which reason the stripping edge unit 5 can orient itself freely. In the example illustrated, the oblique-positioning angle α is 15 degrees and is measured between the orthogonal to the belt running direction 12 and the stripping edge unit 5.

It is also the case with this embodiment that the stripping-body axis of rotation 8 has to intersect the belt precisely at the point of contact between the stripping edge unit 5 and the belt 7, in order for the stripping edge unit 5 to be subjected to uniform wear. In the case of the distance between the stripping-body axis of rotation 10 and the belt 7 changing in this case, e.g. in the case of the stripper being subjected to prestressing or as a result of the height of the stripping edge unit 5 changing due to wear, the geometry causes a rotary movement of the stripping blade about the stripping-body axis of rotation 8. It is only when the stripping-body axis of rotation 8 intersects the belt precisely at the point of contact between the stripping edge unit 5 and the belt 7 that the stripping edge unit 5 is prevented from being pivoted as a result of this effect such that the stripping edge unit is not pressed uniformly onto the belt.

Figure 4:
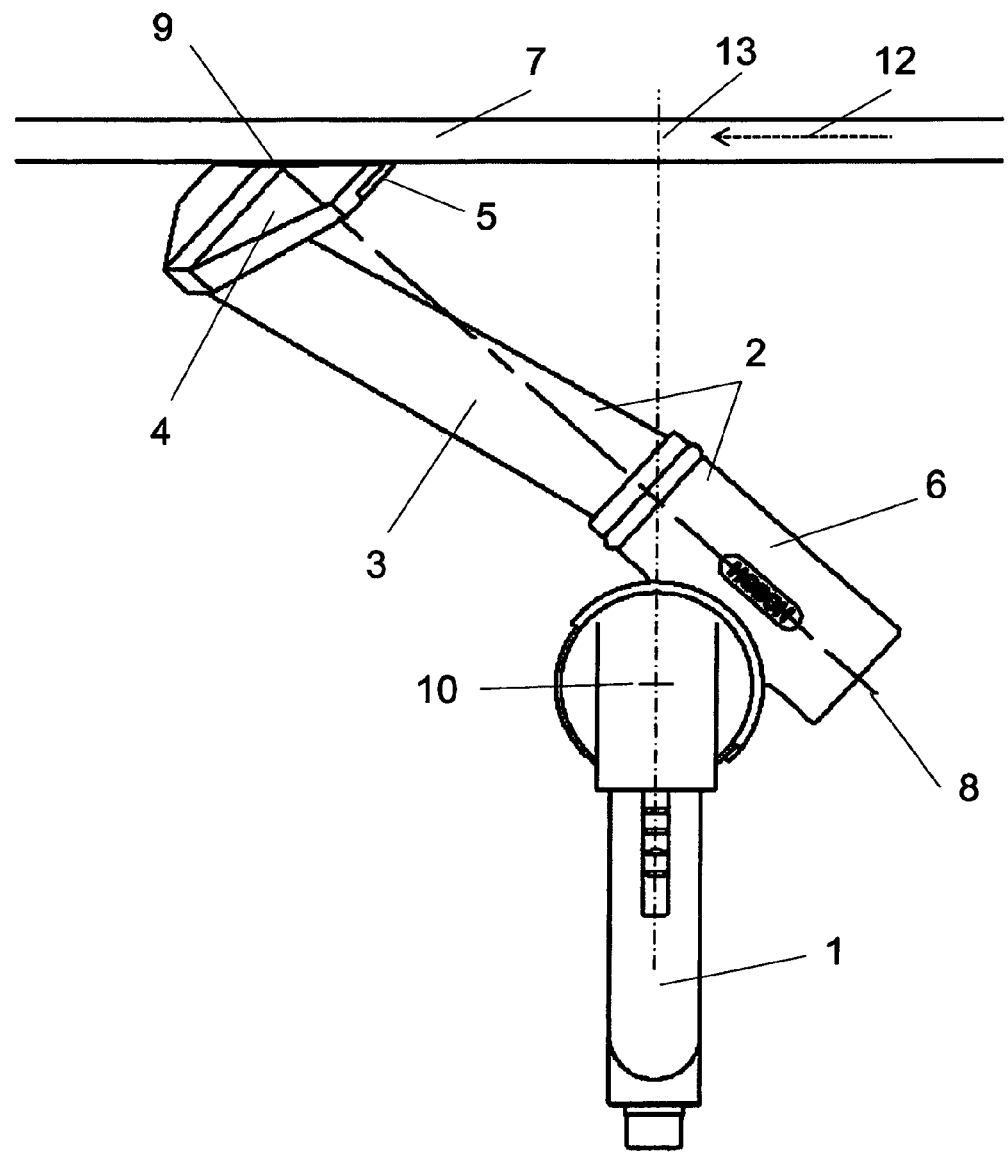
FIG. 4 is a side view of the belt-stripper module as in FIG. 3.

FIG. 4 is a side view of the belt-stripper module as in FIG. 3.

Figure 5:
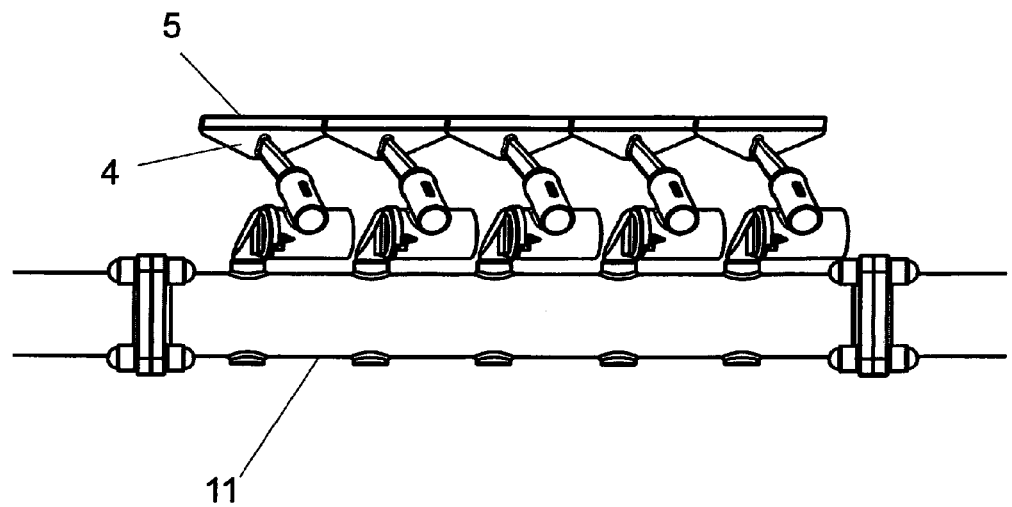
FIG. 5 is a front view of a system carrier in the belt running direction.

FIG. 5 shows a system carrier 11 having numerous obliquely positioned belt-stripper modules, in the example illustrated there are 5 of these, in the belt running direction 12 as seen from the underside of the belt. In this case, the belt-stripper modules are arranged such that they cover the entire belt width without any gaps. The oblique positioning also means that overlapping of the tracks is readily possible without the individual belt-stripper modules impeding one another as they pivot back, for example as they strike against obstructions.

Figure 6:
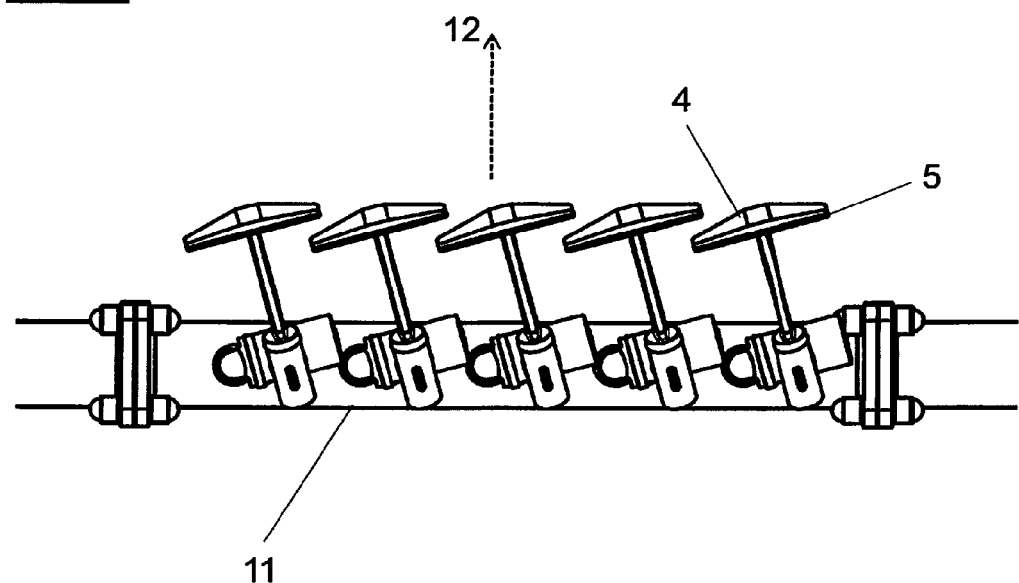
FIG. 6 is a plan view of a system carrier.

FIG. 6 is a corresponding plan view in which the oblique-positioning angle α is 15 degrees. The oblique positioning is achieved, as in FIGS. 1 and 2, by appropriate installation of the belt-stripper modules on the system carrier.

The oblique positioning was tested in a sample test, the stripping edge unit having been replaced by rapidly wearing material, in this case wood was selected, in order for the wear behavior of different arrangements to be tested. The finding here was that non-uniform wear commences as soon as the distance between the point of intersection 9 and the belt 7 exceeds a few millimeters, and also that the manner of oblique positioning has barely any influence on the wear behavior of the stripping edge unit. It is thus possible for the oblique positioning to be optimized in dependence on the stripping properties of the bulk material which is to be stripped, wherein a person skilled in the art can set the oblique-positioning angle α and the best overlapping arrangement of the belt-stripper tracks in each individual case on the basis of straightforward preliminary tests and experience.

Subsequently carried out, in the form of dynamic simulation, were sample calculations in which the forces applied by the belt and stripped-off bulk material were simulated by a constant frictional force in the belt running direction. Tests 1 to 3 used a belt-stripper module corresponding to FIG. 3, while tests 4 and 5 used a belt-stripper module according to FIG. 1a/1b.

| | Test | | | | |
|---|---|---|---|---|---|
| | 1 | 2 | 3 | 4 | 5 |
| Angle α (degrees) in a new state | 15 | 15 | 14.2 | 15 | 15 |
| Angle α (degrees) following wear | 17.7 | 15.33 | 27.5 | 15 | 15 |
| Angle β (degrees) in a new state | 120 | 120 | 120 | 120 | 120 |
| Angle β (degrees) following wear | 132 | 132 | 132 | 132 | 132 |
| Axis of rotation 8 intersects the stripping edge unit | yes | no | no | yes | no |
| Angle (degrees) between the axis of rotation 8 and belt in a new state | 30 | 0 | 65 | 30 | 50 |
| Angle (degrees) between the axis of rotation 8 and belt following wear | 42 | 12 | 77 | 42 | 62 |
| Force on the right (N) in a new state | 71.1 | 59.7 | 66.4 | 60.2 | 66.1 |
| Force on the left (N) in a new state | 70.8 | 59.3 | 65.6 | 61.5 | 51.0 |
| Force on the right (N) following wear | 48.2 | 34.2 | 58.2 | 52.2 | 70.0 |
| Force on the left (N) following wear | 49.4 | 41.6 | 25.8 | 53.4 | 51.0 |

As can be seen for tests 2, 3 and 5, considerably different contact pressures on the sides of the stripping edge unit arise during operation, even in the case of arrangements being otherwise different, whenever the axis of rotation 8 does not intersect the stripping edge unit, different degrees of wear therefore being the result.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Base
2 Stripping body
3 Cutter carrier
4 Stripping blade
5 Stripping edge unit
6 Bushing
7 Belt
8 Stripping-body axis of rotation 9 Point of intersection
10 Stripping-body pivot axis
11 System carrier
12 Belt running direction
13 Projection line
14 Triangle of forces
α Oblique-positioning angle
R Frictional force
R1 Frictional force

The invention claimed is:

1. A belt-stripper module for a stripping apparatus for a return region of a conveyor belt, the belt-stripper module comprising:
   a base which is fastenable in a system carrier;
   a stripping body comprising:
      a cutter carrier;
      a stripping blade attached to the cutter carrier;
      a bushing, the cutter carrier being mounted in the bushing such that the cutter carrier is rotatable about a stripping-body axis of rotation, and
      a stripping edge unit attached to the stripping blade, the stripping edge unit being positionable so as to form an obtuse angle β relative to the conveyor belt in a running direction of the conveyor belt and to rest against the conveyor belt at an acute angle α, as measured at a right angle to the running direction and as seen in direction of the belt surface, the stripping-body axis of rotation being oriented such that the stripping-body axis of rotation intersects the stripping edge unit of the stripping blade at a point of intersection, and
   a stripping-body pivot axis having a torsion spring, the stripping-body pivot axis connecting the base and the stripping body in such a manner that the stripping-body pivot axis is configured to press the stripping body against the conveyor belt, the stripping-body pivot axis, as seen in the running direction, being located in front of the point of intersection.

2. The belt-stripper module according to claim 1, wherein the angle α is between 5 degrees and 45 degrees.

3. The belt-stripper module according to claim 1, wherein the angle α is between 10 degrees and 30 degrees.

4. The belt-stripper module according to claim 1, wherein the angle α is equal to 15 degrees.

5. The belt-stripper module according to claim 1, wherein the point of intersection between the stripping-body axis of rotation and the stripping edge unit of the stripping blade is located halfway up a wear height of the stripping edge unit.

6. The belt-stripper module according to claim 1, wherein the stripping edge unit is positioned with the obtuse angle β relative to the conveyor belt and rests against the conveyor belt at the acute angle α, the stripping-body pivot axis pressing the stripping body against the conveyor belt.

7. A system carrier, comprising:
   one to twenty belt-stripper modules each comprising:
      a base which is fastened in the system carrier;
      a stripping body comprising:
         a cutter carrier;
         a stripping blade attached to the cutter carrier;
         a bushing, the cutter carrier being mounted in the bushing such that the cutter carrier is rotatable about a stripping-body axis of rotation, and
         a stripping edge unit attached to the stripping blade, the stripping edge unit being positionable so as to form an obtuse angle β relative to the conveyor belt in a running direction of the conveyor belt and to rest against the conveyor belt at an acute angle α, as measured at a right angle to the running direction and as seen in direction of the belt surface, the stripping-body axis of rotation being oriented such that the stripping-body axis of rotation intersects the stripping edge unit of the stripping blade at a point of intersection, and
      a stripping-body pivot axis having a torsion spring, the stripping-body pivot axis connecting the base and the stripping body in such a manner that the stripping-body pivot axis is configured to press the stripping body against the conveyor belt, the stripping-body pivot axis, as seen in the running direction, being located in front of the point of intersection;
   wherein the belt-stripper modules are all positioned obliquely at the same angle α and are configured such that the stripping blades cover an entire width of the conveyor belt.

8. The system carrier according to claim 7, wherein the belt-stripper modules are arranged such that belt stripper tracks on the belt overlap.

9. The system carrier according to claim 7, wherein the stripping edge unit is positioned with the obtuse angle β relative to the conveyor belt and rests against the conveyor belt at the acute angle α, the stripping-body pivot axis pressing the stripping body against the conveyor belt.

10. A method of installing a belt-stripper module, comprising:
   providing the belt-stripper module comprising:
      a base which is fastenable in a system carrier;
      a stripping body comprising:
         a cutter carrier;
         a stripping blade attached to the cutter carrier;
         a bushing, the cutter carrier being mounted in the bushing such that the cutter carrier is rotatable about a stripping-body axis of rotation, and
         a stripping edge unit attached to the stripping blade, the stripping-body axis of rotation being oriented such that the stripping-body axis of rotation intersects the stripping edge unit of the stripping blade at a point of intersection, and
      a stripping-body pivot axis having a torsion spring, the stripping-body pivot axis connecting the base and the stripping body, the stripping-body pivot axis, as seen in a running direction of the conveyor belt, being located in front of the point of intersection; and
   positioning the stripping edge unit such that the stripping edge unit forms an obtuse angle β relative to the conveyor belt in the running direction of the conveyor belt and rests against the conveyor belt at an acute angle α, as measured at a right angle to the running direction and as seen in direction of the belt surface, and such that the stripping-body pivot axis presses the stripping body against the conveyor belt.

* * * * *